United States Patent Office 3,071,563

Patented Jan. 1, 1963

3,071,563

ALUMINUM-CONTAINING PHENOLIC RESINS

Felix Schlenker, Wiesbaden, Germany, assignor to Chemische Werke Albert, Wiesbaden-Biebrich, Germany, a corporation of Germany No Drawing. Filed Mar. 12, 1959, Ser. No. 798,844
14 Claims. (Cl. 260—50)

This invention relates to aluminum-modified phenolic resins and methods of producing the same.

In addition to phenolic resins derived from simple phenols by condensation with various aldehyde and ketone compounds, several phenolic resins modified by organic radicals have been produced, such as for example, alkylphenolic resins, resin-acid-modified phenolic resins and terpene-phenol resins. The degree to which the basic phenolic resin can be modified by the added radicals is limited because the substituent radicals are organic in nature, and for many purposes the degree of difference in properties is insignificant or unimportant.

All processes hitherto known for the preparation of phenolic resins of any kind, are based on the use of polymerizable cocponents of purely organic character.

The object of the present invention is to produce a new series of modified phenolic resins having many properties superior to the known plain phenolic and modified phenolic resins. More specifically, it is the purpose of the invention to produce resins capable of providing more durable films and molded compositions, as greater resistance to water or moisture and chemicals including solvents and fuel mixtures. Another object is to produce phenolic molding resins and resin compositions having superior hardening and other properties.

These and other objects are accomplished under the present invention by the provision of aluminum-modified phenolic resins. The basic embodiment of the process of invention involves the utilization of aluminum phenolates instead of the usual or known phenolic component for condensing with the conventional or known aldehydes or ketones for the production of new phenolic resins.

The aluminum phenolates employed can be obtained, as is generally known, from aluminum and phenol in a direct reaction. Such compounds, however, can easily be obtained from aluminum alcoholates such as aluminum-tri-isopropoxide and aluminum-tributoxide through "re-alcoholization" of the phenolic ingredient. The formation of the phenolate takes place under very mild conditions due to the acid character of phenols. The aluminum phenolates have high melting points and are compounds of more or less dark color. Due to the acid properties of phenols, they are relatively stable in comparison with aluminum alcoholates which have a ready tendency to hydrolyze. In the production of the phenolate, the proportion of reactants mixed together may be chosen so as to transform only part of the phenol to the phenolate thereby leaving some of the hydroxy groups in free condition. This mixture also can be advantageously used to produce modified resins of improved properties by condensation with aldehydes or ketones by the usual procedure.

The process of the invention is applicable to aluminum phenolates of phenols as a class possessing the capacity of forming resinous products with aldehydes. Suitable sources of the phenolic component include phenol itself, cresols, xylenols, alkylphenols such as p-tertiary butylphenol, p-tertiary amylphenol, terpenephenols and the like; also diphenols like hydroquinone, resorcinol, p-p′-dihydroxy diphenyl methane and its homologues and other derivatives of this type.

For the production of the new resins from aluminum phenolates, the instant invention contemplates any and all of the known aldehydes and ketones known to form resins with phenol. Examples of carbonyl condensing compounds which can be used are formaldehyde, acetaldehyde, benzaldehyde, the unsaturated aldehydes, as crotonaldehydes; also acetone, cyclohexanone and the like.

The instant invention is applicable also to the production of aluminum-modified oil-plasticized phenol resins and fatty acid-plasticized phenol resins. These resins can be produced by converting the phenolic components generally employed for the production of this type of resin into the corresponding aluminum phenolate and then reacting with the desired carbonyl-condensing compound.

In carrying out the process of the basic embodiment of the invention, an aluminum phenolate is, either as such or in solution (most advantageously in acetoacetic ester), mixed with the carbonyl-condensing compound, either as such or in solution, and the resulting mass is then heated, preferably under reflux to cause the condensation to take place. After completion of this reaction the resinous product formed is freed from the volatile components of the reaction mass including the solubilizing medium used, if any, by evaporation under mild temperatures with the aid of a vacuum. The aluminum-modified phenolic resins thereby obtained can then be further processed by any of the known methods.

The aluminum-modified phenolic resins of the present invention differ substantially in their characteristics from conventional phenolic resins. The new resins are remarkable especially with reference to the ease with which they may be hardened, such action frequently taking place at temperatures which are about 40° C. below the hardening temperature of the normal phenol resins. Furthermore the hardening operation takes less time to accomplish. These properties are of special importance in the manufacture of phenolic molding resins, of phenolic resin molding compositions and, particularly of those resins used in baking lacquers or enamels.

The new resins of the present invention are of particular value because of their capacity for producing films of increased resistance upon exposure to chemicals and motor-fuel mixtures.

*Example 1*

One mol of aluminum phenolate (309 g.) is dissolved in one mol of acetoacetic ester (130 g.) and to this solution, one mol of paraformaldehyde is added portionwise during heating under reflux. The resulting mixture is then heated and boiled for an extended period (2 or 3 hours) under reflux and the product obtained is then heated under vacuum at 150° C. oil-bath temperature until the solvent is removed. An easily hardened aluminum-modified phenolic resin is obtained.

*Example 2*

One mol of cyclohexanone is gradually added to one mol of melted aluminum phenolate and the resulting mixture is then heated for an extended period (about two hours) under reflux. After the volatile components have been vaporized off under vacuum, a resin is obtained which is easily hardened.

*Example 3*

One mol of aluminum cresolate is dissolved in 1.5 mols of acetoacetic ester. Thereupon one mol of paraformaldehyde is added portionwise to the resulting solution in the manner described in Example 1. Through this procedure an easily hardenable aluminum-modified phenolic resin is obtained having particularly desirable properties.

*Example 4*

One mol of aluminum butylate is heated under reflux with two mols of phenol for two hours and the product thus obtained is immediately thereafter condensed with one mol of paraldehyde under reflux. The volatile components of the reaction mixture are distilled off under vacuum at an oil-bath temperature of about 120° C. The product obtained is a hardenable aluminum-modified phenolic resin.

*Example 5*

Two mols of cyclohexanone are gradually added to one mol of melted aluminum cresolate and the resulting mixture is then heated for about 2 to 3 hours under reflux. Upon vaporizing off the volatile components of the reaction mass under vacuum, an easily hardenable resin is obtained.

*Example 6*

One mol of melted aluminum phenolate is dissolved in one mol of acetoacetic ester. Thereupon two mols of crotonaldehyde are added gradually to the solution while heating under reflux. The mixture is heated under reflux for three hours and subsequently the volatile components are removed by distillation under vacuum at an oil-bath temperature of 170° C. An easily hardened aluminum-modified phenolic resin is obtained.

*Example 7*

One hundred and seventy-four grams of butanol are poured over 174 grams of Al-m-cresolate in a heating flask. Thereupon 45 grams of paraformaldehyde are introduced and heating is effected during refluxing until the viscosity increase indicates that the desired degree of condensation has taken place. The viscosity increase which occurs is set out in the following table:

| Time after beginning of reaction: | Viscosity 20° C./undiluted |
|---|---|
| 5 min | cps 64.4 |
| 1 hr. 15 min | cps 132.5 |
| 1 hr. 30 min | cps 783.0 |

This application is a continuation-in-part of application Serial No. 386,663, filed October 16, 1953, now Patent No. 2,886,554.

It should be understood that the present invention is not limited to the details herein given but extends to all equivalent materials, procedures and conditions of reaction which will occur to those skilled in the art upon consideration of the scope of the claims appended hereto.

I claim:

1. A process for producing aluminum-modified phenolic resins which comprises forming said resins by heating to a resin-forming temperature an aluminum phenolate of a phenol containing up to two benzene nuclei and up to two phenolic hydroxy groups and a carbonylic compound selected from the group consisting of aldehydes and ketones which are free from carbocyclic ring systems.

2. A process for producing aluminum-modified phenolic resins which comprises forming said resins by reacting an aluminum phenolate of a phenol containing up to two benzene nuclei and up to two phenolic hydroxy groups with a carbonylic compound selected from the group consisting of aldehydes and ketones which are free from carbocyclic ring systems by heating a mixture of said compounds under reflux boiling.

3. A process for producing aluminum-modified phenolic resins which comprises forming said resins by reacting an aluminum phenolate of a phenol containing up to two benzene nuclei and up to two phenolic hydroxy groups with a carbonylic compound selected from the group consisting of aldehydes and ketones which are free from carbocyclic ring systems by heating to a resin-forming temperature a mixture of said compounds in the presence of a solvent.

4. A process for producing aluminum-modified phenolic resins which comprises forming said resins by reacting an aluminum phenolate of a phenol containing up to two benzene nuclei and up to two phenolic hydroxy groups with a carbonylic condensing compound selected from the group consisting of aldehydes and ketones which are free from carbocyclic ring systems by heating a mixture of said compounds in the presence of acetoacetic ester as a solvent.

5. A process for producing aluminum-modified phenolic resins which comprises forming said resins by heating to a resin-forming temperature an aluminum phenolate of a phenol containing up to two benzene nuclei and up to two phenolic hydroxy groups and formaldehyde.

6. A process for producing aluminum-modified phenolic resins which comprises forming said resins by heating to a resin-forming temperature an aluminum phenolate of a phenol containing up to two benzene nuclei and up to two phenolic hydroxy groups and paraldehyde.

7. A process for producing aluminum-modified phenolic resins which comprises forming said resins by heating to a resin-forming temperature an aluminum phenolate of a phenol containing up to two benzene nuclei and up to two phenolic hydroxy groups and paraformaldehyde.

8. A process for producing aluminum-modified phenolic resins which comprises forming said resins by heating to a resin-forming temperature an aluminum phenolate of a phenol containing up to two benzene nuclei and up to two phenolic hydroxy groups and crotonaldehyde.

9. The process which comprises mixing an aluminum phenolate of a phenol containing up to two benzene nuclei and up to two phenolic hydroxy groups with a carbonylic compound selected from the group consisting of aldehydes and ketones which are free from carbocyclic ring systems, heating the resulting mixture under reflux until resinification occurs and distilling off the volatile components of said mass, thereby providing an aluminum-modified phenolic resin.

10. The process which comprises mixing an aluminum phenolate of a phenol containing up to two benzene nuclei and up to two phenolic hydroxy groups with an aldehyde which is free from carbocyclic ring systems, heating the resulting mixture under reflux until resinification occurs and distilling off the volatile components of said mass with the aid of a vacuum, thereby producing an aluminum-modified phenolic resin.

11. Resinous aluminum phenolate-aldehyde condensation products obtained by condensing an aluminum phenolate of a phenol containing up to two benzene nuclei and up to two phenolic hydroxy groups with an aldehyde which is free from carbocyclic ring systems.

12. Resinous aluminum phenolate-ketone condensation products obtained by condensing an aluminum phenolate of a phenol containing up to two benzene nuclei and up to two phenolic hydroxy groups with a ketone which is free from carbocyclic ring systems.

13. Heat-hardenable phenolic resin intermediates, which are aluminum phenolate-aldehyde condensation products obtained by condensing an aluminum phenolate of a phenol containing up to two benzene nuclei and up to two phenolic hydroxy groups with an aldehyde which is free from carbovyclic ring systems.

14. Heat-hardenable phenolic resin intermediates, which are aluminum phenolate-ketonic condensation products obtained by condensing an aluminum phenolate of a phenol containing up to two benzene nuclei and up to two phenolic hydroxy groups with a ketone which is free from carbocyclic ring systems.

References Cited in the file of this patent

UNITED STATES PATENTS

| | | |
|---|---|---|
| 1,918,996 | Weger | July 18, 1933 |
| 2,064,885 | Carpenter | Dec. 22, 1936 |
| 2,292,205 | Denison | Aug. 4, 1942 |
| 2,361,804 | Wilson | Oct. 31, 1944 |
| 2,580,274 | Bergstrom | Dec. 25, 1951 |
| 2,715,626 | Pfister et al. | Aug. 16, 1955 |
| 2,736,701 | Neff | Feb. 28, 1956 |
| 2,742,449 | Schlenker | Apr. 17, 1956 |
| 2,886,554 | Schlenker | May 12, 1959 |

FOREIGN PATENTS

| | | |
|---|---|---|
| 120,451 | Sweden | Dec. 16, 1947 |

OTHER REFERENCES

Chem. Abstracts, vol. 42, page 7528h (1948).

The Condensed Chemical Dictionary, 5th ed., Reinhold (1956), page 33 under "alcohol."